United States Patent
Fukuyama et al.

(10) Patent No.: US 6,231,244 B1
(45) Date of Patent: *May 15, 2001

(54) OPTICAL FIBER ARRAY

(75) Inventors: Masashi Fukuyama, Komaki; Hironori Kurimoto, Kounan, both of (JP)

(73) Assignee: NGK Insulators, Ltd., Nagoya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/217,506

(22) Filed: Dec. 21, 1998

(30) Foreign Application Priority Data

Dec. 26, 1997 (JP) .................................................. 9-361409
Dec. 18, 1998 (JP) .................................................. 10-360434

(51) Int. Cl.⁷ ................................................... G02B 6/36
(52) U.S. Cl. ................................................. 385/76; 385/77
(58) Field of Search ........................................ 385/76, 77

(56) References Cited

U.S. PATENT DOCUMENTS 6,118,917 * 9/2000 Lee et al. .................. 385/49

FOREIGN PATENT DOCUMENTS 0926 520 * 6/1999 (EP) ................................ G02B/6/36
9-133833 5/1997 (JP) .

* cited by examiner

*Primary Examiner*—Frank G. Font
*Assistant Examiner*—Roy M. Punnoose
(74) *Attorney, Agent, or Firm*—Burr & Brown

(57) ABSTRACT

An optical fiber array comprises an upper substrate and a lower substrate in which V-shaped grooves are formed, wherein optical fibers are inserted and arranged in the V-shaped grooves and are solidified using an adhesive. The lower substrate comprises a V-shaped groove section having V-shaped grooves in which the optical fibers are aligned and arranged, a covered optical fiber support section for supporting covered optical fibers, and a free buffer section located between the V-shaped groove section and the covered optical fiber support section and that is prevented from restricting the alignment and arrangement of the optical fibers, wherein the free buffer section continues with the covered fiber support section via a step. The optical fiber array allows the positional relationship between an uncovered optical fiber and a covered optical fiber to be set accurately, that can prevent its characteristics from being degraded, and that can avoid problems such as an open circuit in the fibers.

7 Claims, 4 Drawing Sheets

*PRODUCT WIDTH 5mm

*PRODUCT WIDTH 5mm

OPTICAL FIBER ARRAY

BACKGROUND OF THE INVENTION AND RELATED ART STATEMENT

The present invention relates to an optical fiber array.

Due to the increasing density of optical fibers, more and more fibers are used for planar waveguides (PLC). To avoid the increase in size of waveguide elements associated with the increasing number of fibers and to further increase the density, efforts are being made to reduce the conventional standard type waveguide pitch (250 $\mu$m) down to about a half, that is, 127 $\mu$m.

To account for the increasing density of optical fibers and the decreasing waveguide pitch, efforts are also being made to reduce down to 127 $\mu$m the inter-fiber pitch of fiber arrays connected to optical fibers.

As a conventional technique for reducing the pitch of fibers, a configuration has been proposed and examined wherein two sets of optical fibers 14 of standard tape fibers 13 are mutually overlapped in such a way that the upper and lower fibers 14 are alternately aligned in V-shaped grooves 16 in a V-shaped groove substrate 10 as shown in FIG. 7 (Document: see 1997 Electronic Information Communication Society Electronics Society Convention, C-3-113 "PLC Splitter Module Using 127 $\mu$m-pitch Optical Fiber Array").

This configuration, however, requires taper to overlap as shown in FIG. 6, and unless the distance between the covered optical fibers 13 and the end of the substrate 11 where the naked fibers 14 are held is set at a predetermined value or more, this taper angle increases to cause losses or defects such as open circuits. Thus, to minimize the losses, the bend radius of the naked fibers 14 is set at 20 mm or less.

In the fiber array according to the above conventional document, the V-shaped grooves and a step portion 12 are formed in the V-shaped groove substrate 10 so as to mount covered optical fibers in the step portion as shown in FIG. 7.

In such a fiber array having such a V-shaped groove substrate 10, since normal tape fibers have a 250-$\mu$m pitch, for example, the fiber interval at both ends of an 8-core tape fiber is 1.75 mm. Due to the manufacturing error of about 0.1 mm, when the covered optical fibers 13 are arranged in such a way as to contact the step portion 12, the naked fibers 14 are distinctly tapered to cause an open circuit. If the naked fibers 14 is shifted slightly backward from their original positions, the open circuit can be avioded because the taper is decreased. However, this requires increase in adhesive stress and adjustment. The fibers have to be shifted about 2 mm backward to secure a bend radius of 20 mm of the fibers. There is some apprehension that this cause deterioration in properties of the optical fibers due to the adhesive stress in this part.

FIG. 5 shows an example of a half-pitch fiber array in which the conventional pitch of 250 $\mu$m is reduced to about a half.

In this figure, a covered fiber housing substrate 15 is stuck and fixed to a lower substrate (V-shaped groove substrate) 10 having V-shaped grooves, from above a step portion 12 in the V-shaped groove substrate 10. Then, tape fibers (covered fibers) 13a and 13b are inserted through a covered fiber housing groove 17 formed in the covered fiber housing substrate 15, in such a way as to overlap each other, and the upper and lower fibers are alternately aligned in the V-shaped grooves. Then, an upper substrate (a fiber presser substrate) 11 is installed and fixed from above the V-shaped grooves in the V-shaped groove substrate 10 to form an optical fiber array 22.

In FIG. 5, to reduce the taper angle of the overlapping fibers, the fibers are shifted slightly backward from their original positions.

Since, however, an adhesive is filled in the overlapping fiber portion 21, the thermal expansion of the adhesive causes stress in the fibers to degrade the characteristics of the optical fiber array 22, for example, to cause losses in the optical fiber array.

In addition, shifting the fibers slightly backward requires adjustments, and shifting them backward, for example, about 4.9 mm enables a sufficient bend radius of the fibers to be obtained to avoid losses. If, however, adjustments are insufficient and the shifting distance is short, the bend radius of the fibers decreases to increase the taper angle, while if the shifting distance is excessively long, the amount of adhesive filled in the overlapping fiber portion increases possibility to degrade the characteristics of the optical fiber array 22.

SUMMARY OF THE INVENTION

This invention is provided to solve these problems, and its object is to provide an optical fiber array that can accurately set the positional relationship between non-covered optical fibers and covered optical fibers to avoid the degradation of the characteristics of the array and open circuits in the fibers.

The present invention provides an optical fiber array comprising an upper substrate and a lower substrate in which V-shaped grooves are formed, optical fibers being inserted and arranged in the V-shaped grooves and being solidified using an adhesive, wherein the lower substrate comprises a V-shaped groove section having V-shaped grooves in which the optical fibers are aligned and arranged, a covered optical fiber support section for supporting covered optical fibers, and a free buffer section located between the V-shaped groove section and the covered optical fiber support section and that is prevented from restricting the alignment and arrangement of the optical fibers, and wherein the free buffer section continues with the covered optical fiber support section via a step.

According to this invention, a taper is preferably formed on the surface of the upper substrate opposed to the free buffer section of the lower substrate, and this invention is preferably applied to a half-pitch optical fiber array in which two sets of tape fibers are mutually overlapped.

In addition, a taper is preferably formed in the portion of the free buffer section that is connected to the V-shaped grooves because it serves to avoid the concentration of stress on the fibers at the edges of the V-shaped grooves.

BRIEF DESCRIPTION OF THE DRAWINGS

FIG. 3(a) is a left side view.

FIG. 4(a) is a left side view.

DETAILED DESCRIPTION OF PREFERRED EMBODIMENT

Embodiments of this invention are described below in detail with reference to the drawings.

Figure 1:
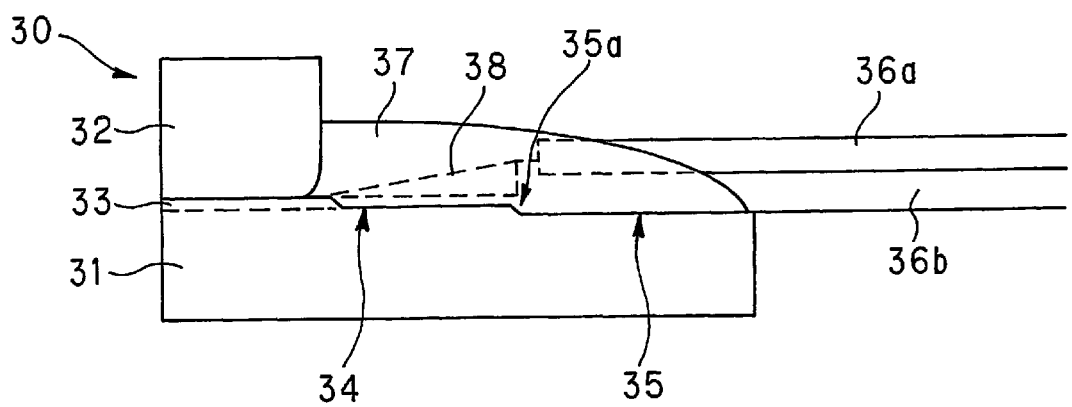
FIG. 1 is a schematic front view showing one embodiment of a half-pitch optical fiber array according to this invention.

FIG. 1 is a schematic front view showing one embodiment of a half-pitch optical fiber array according to this invention.

In FIG. 1, a ferrule 30 is composed of a lower substrate 31 (a V-shaped groove substrate) having V-shaped grooves 33 and an upper substrate 32 (a fiber presser substrate) located over the V-shaped groove 33 in a V-shaped groove substrate 31 and joined with the lower substrate, and in addition to the V-shaped grooves 33, the V-shaped groove substrate 31 has on its side opposed to the upper substrate 32, a first step portion 34 that is a free buffer section and a second step portion 35 that is a covered optical fiber support section. In this ferrule 30, there is an open space above the first and second step portions 34 and 35. Covered optical fibers (tape fibers) 36a and 36b that are mutually overlapped are inserted and arranged in the ferrule 30, and non-covered optical fibers 38 at the tips of the fibers are inserted into a fiber insertion hole formed by the V-shaped grooves 33 and the upper substrate 32. Then, an adhesive 37 is used to fix the covered optical fibers (tape fibers) 36a and 36b and non-covered optical fibers 38.

In this manner, in the V-shaped groove substrate 31 of the ferrule 30, the free buffer section 34 continues with the covered optical fiber support section 35 via the step, so a positioning step 35a for the covered optical fibers (tape fibers) 36a and 36b can be installed on the second step portion 35 that is the optical fiber support section, thereby enabling the accurate setting of the distance over which the naked optical fibers are shifted backward from the original positions. Besides, the first step portion 34 that is the free buffer section is provided that does not have a V-shaped groove and that is prevented from restricting the alignment and arrangement of the optical fibers. As a result, despite the presence of an error in the pitch of the covered optical fibers (tape fibers) 36a and 36b, the taper can be obtained to avoid problems such as open circuits.

Figure 2:
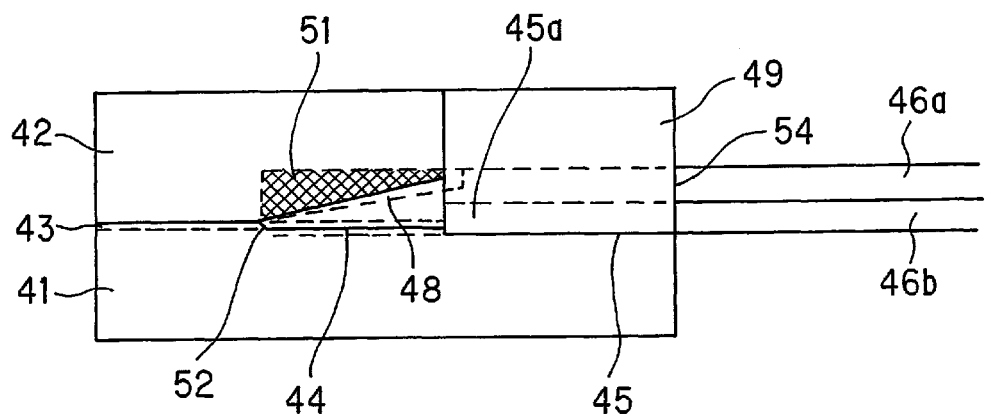
FIG. 2 is a schematic front view showing another embodiment of a half-pitch optical fiber array according to this invention.

FIG. 2 is a schematic front view showing another embodiment of a half-pitch optical fiber array of this invention, and differs from the embodiment in FIG. 1 in that a covered fiber housing substrate is installed over the second step portion of the V-shaped groove substrate.

In FIG. 2, in addition to V-shaped grooves 43, a lower substrate (a V-shaped groove substrate) 41 has on its side opposed to an upper substrate 42, a first step portion (a free buffer section) 44 and a second step portion (a covered optical fiber support section) 45. A covered fiber housing substrate 49 is placed and fixed on the second step portion 45 of the V-shaped groove substrate 41, and the V-shaped groove substrate 41 and the covered fiber housing substrate 49 are stuck and fixed together to form a covered fiber housing groove 54.

Covered optical fibers (tape fibers) 46a and 46b that are mutually overlapped are inserted and arranged in the covered fiber housing groove 54, and non-covered optical fibers 48 at the tips of the fibers are arranged in the V-shaped grooves 43 in the V-shaped groove substrate 41. Then, the upper substrate (the fiber presser substrate) 42 is installed from above the V-shaped grooves 43 in the V-shaped groove substrate 41 and the first step portion 44 to press and fix the optical fibers 48. A reference numeral 45a designates a positioning step for the covered optical fibers 46a and 46b.

Figure 5:
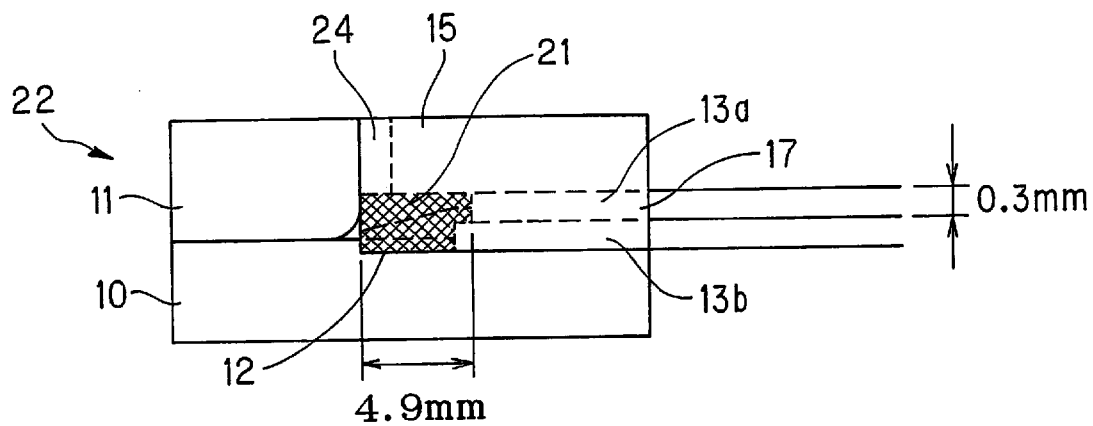
FIG. 5 is a front view showing an example of a conventional half-pitch fiber array.
Figure 6:
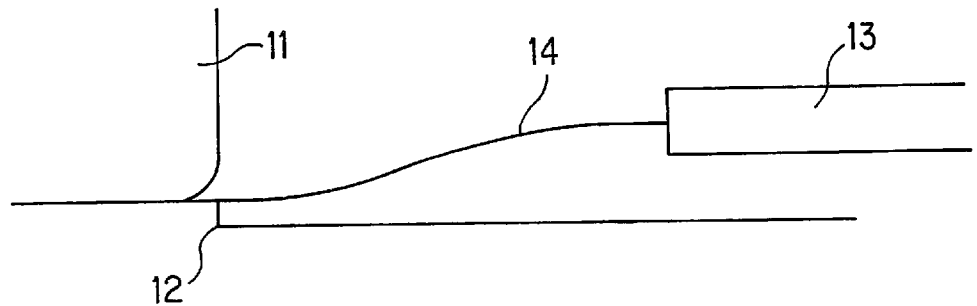
FIG. 6 is a schematic view of a taper in two overlapped tape fibers.
Figure 7:
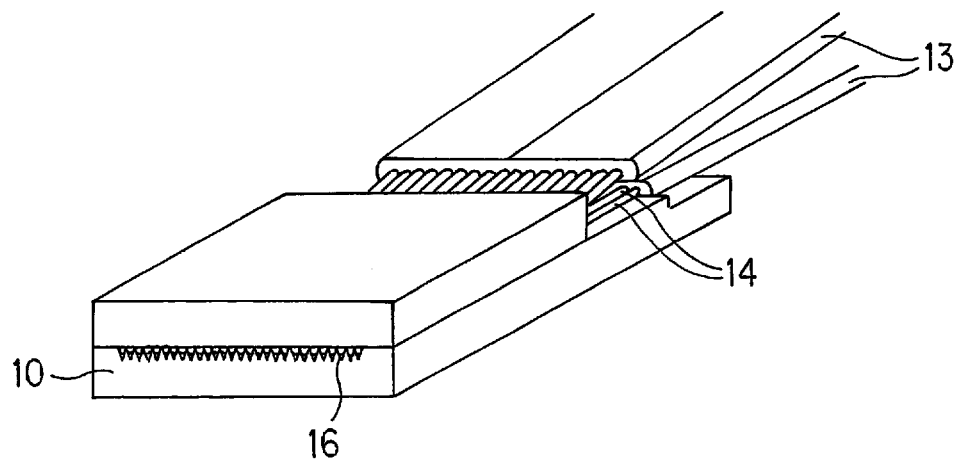
FIG. 7 is a perspective view showing an example of a configuration of conventional two-stage optical fiber array.

According to the embodiment shown in FIG. 2, the amount of adhesive that must be filled in an area 51 over the first step portion 44 can be reduced compared to the conventional example shown in FIG. 5, thereby reducing the stress caused by the thermal expansion or contraction of the adhesive to provide excellent characteristics.

In addition, if a taper 50 is formed on the surface of the upper substrate (the fiber presser substrate) 42 opposed to the first step portion 44, this can avoid applying stress to the fibers 48 of the upper tape fibers 46a. The starting position of the taper 50 is preferably located on the V-shaped groove 43.

In the optical fiber array as shown in FIG. 2, taking the tolerance of the bending of the fibers into account, if tape fibers of thickness 0.3 mm and specific refraction difference 0.2% are used and if the losses are to be maintained below 0.1 dB/km, the lower limit of the length of the first step portion 44 is 4.9 mm. However, it is not limited because the loss requirement depends on mode of use. On the other hand, the upper limit of the length of the first step portion 44 is preferably 10 mm or less because the length of a portion covered with an adhesive such as resin is preferably shorter.

As shown in FIG. 5, in the conventional optical fiber array, an air vent hole 24 for the application of an adhesive is provided in the covered fiber housing substrate 15 in the vertical direction. The adhesive is also filled in this air vent hole 24, so preferably this hole should not be provided. On the other hand, according to the embodiment of this invention shown in FIG. 2 a hole is formed in the side of the first step portion 44 and functions as a conventional air vent function, thereby eliminating the needs for the air vent hole.

Moreover, a taper 52 is preferably formed on the portion of the first step portion 44 that is connected to the V-shaped grooves 43 because it serves to avoid the concentration of stress on the fibers at the edges of the V-shaped grooves 43.

As described above, the configurations shown in FIGS. 1 and 2 can provide a half-pitch optical fiber array that has an excellent assembly operability and an improved reliability such as improved characteristics.

Of course, this invention is applicable not only to the half-pitch optical fiber array shown in FIGS. 1 and 2 but also to a 250-$\mu$m picth optical fiber array that is a standard product.

The optical fiber array according to this invention is specifically described below with reference to embodiments, but this invention is not limited to these embodiments.
(Embodiment 1)

Figure 3A:
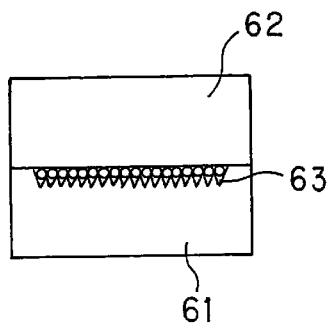
FIGS. 3(a)(b)(c) show a half-pitch optical fiber array produced according to Embodiment 1.
Figure 3B:
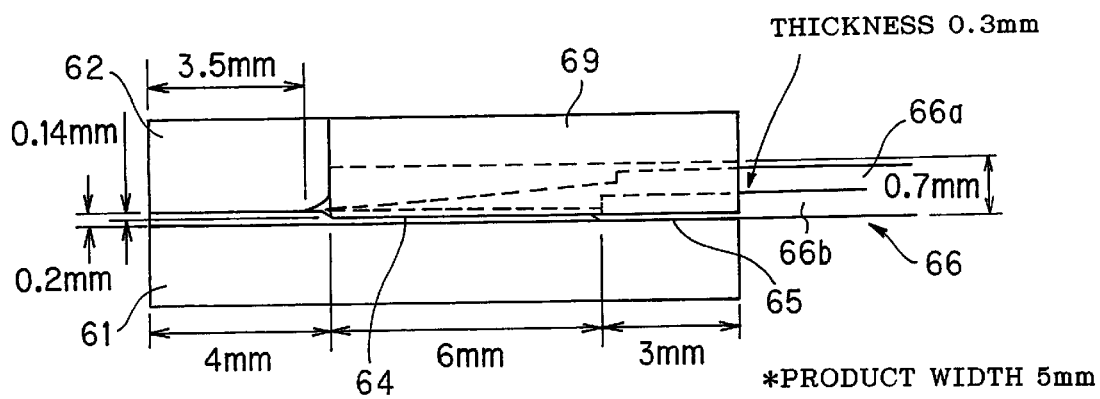
FIG. 3(b) is a front view.
Figure 3C:
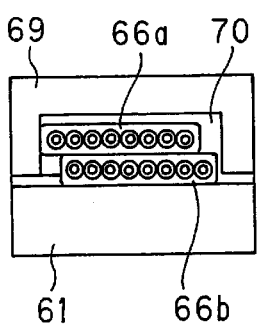
FIG. 3(c) is a right side view.

A 16-fiber half-pitch optical fiber array, which is shown in FIGS. 3(a), (b), and (c), was produced.

Since the PLC was formed of quartz (thermal expansion coefficient: $5 \times 10^{-7}/°$ C.) and the substrate was formed of quartz or Si, Pyrex (trade name; manufactured by Corning Incorporated; thermal expansion coefficient: $32.5 \times 10^{-7}/°$ C.), a glass material that has a lower thermal expansion and that is inexpensively available, was used.

First, 128 fiber (16 fibers×8 groups) V-shaped grooves were ground in a 50×50-mm wafer using a micro grinder. The depth of the V-shaped groove 63 was set such that the upper end of the fiber protruded 5 $\mu$m from the groove, thereby allowing the fiber to contact the V-shaped groove at two points.

A step groove crossing the V-shaped grooves 63 was processed using a slicer. The depth of a first step portion 64 was 0.14 mm from the top surface of the substrate so that the bottom of the fiber contacted the step portion 64, wherein the depth of a second step portion 65 was 0.2 mm from the top surface so that the bottom of the lower covered optical fibers (tape fibers) 66a contacted the second step portion 65.

Then, a covered fiber housing substrate 69 corresponding to the first step portion 64 was prepared and placed on the first step portion 64 of the V-shaped groove substrate 61. The substrate 69 was stuck and fixed to the first step portion by accurately aligning it with the first step portion 64 in the lateral direction and also aligning it with a second step portion 65 in the longitudinal direction. Then, a dicing machine was used to cut the wafer into chips wherein in each chip, the length of the V-shaped grooves 63 in the V-shaped groove substrate 61 was 4 mm and wherein the longitudinal lengths of the first and second step portions 64 and 65 were 6 and 3 mm, respectively.

A fiber presser substrate 62 was also prepared that corresponded to the length and width of the V-shaped grooves 63 in the V-shaped groove substrate 61. A back portion of a fiber presser surface of the fiber pressure substrate 62 was tapered lest a load should be excessively concentrated on the fibers and R-chamfered so as not to have edges.

Then, an optical fiber array was assembled.

The lower tape fibers 66b of 0.3 mm thickness were inserted along one of the walls of a covered fiber housing groove 70 formed by the V-shaped grooves 61 and covered fiber housing substrate 69 that were stuck and fixed together, until the ends of the tape fibers 66b abutted on the end of the second step portion 65. Then, by aligning together the relative positions of the covered fiber housing groove 70 and the V-shaped grooves 63, the naked fibers of the tape fibers 66b are arranged in the respective V-shaped grooves 63. In this state, the tape fibers 66b were temporally locked outside the optical fiber array. At this point, the naked fibers were alternately placed in the V-shaped grooves.

Next, the upper tape fiber 66s of thickness 0.3 mm was inserted along the other sidewall of the covered fiber housing groove 70 until it was aligned with the lower tape fiber. Then, the tape fiber 66a was temporarily locked. This operation allows the naked fiber to be placed on the empty V-shaped grooves. It is more preferable that the covered fiber housing groove 70 of the covered fiber housing substrate 69 is provided with a step and that the position where the upper tape fiber 66a is inserted is precisely determined.

Then, the fiber presser substrate 62 was installed on the V-shaped grooves 63, and a load was applied to the substrate using a jig. By pressing the fiber presser substrate 62 against the sidewall of the covered fiber housing substrate 69, the longitudinal position and parallelism of the substrate are automatically determined.

Next, an adhesive consisting of an ultraviolet (UV) hardened resin was applied and introduced through the covered fiber housing groove 70. After moving out from the gaps in the V-shaped grooves 63, the adhesive was left hardened. Subsequently, the end surfaces of the substrates were optically polished to complete an optical fiber array. FIGS. 3(a), (b), and (c) show the final dimensions.

(Embodiment 2)

Figure 4A:
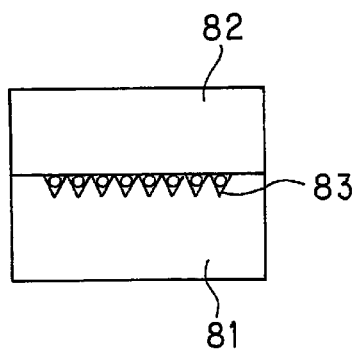
FIGS. 4(a)(b)(c) show a standard type optical fiber array produced according to Embodiment 2.
Figure 4B:
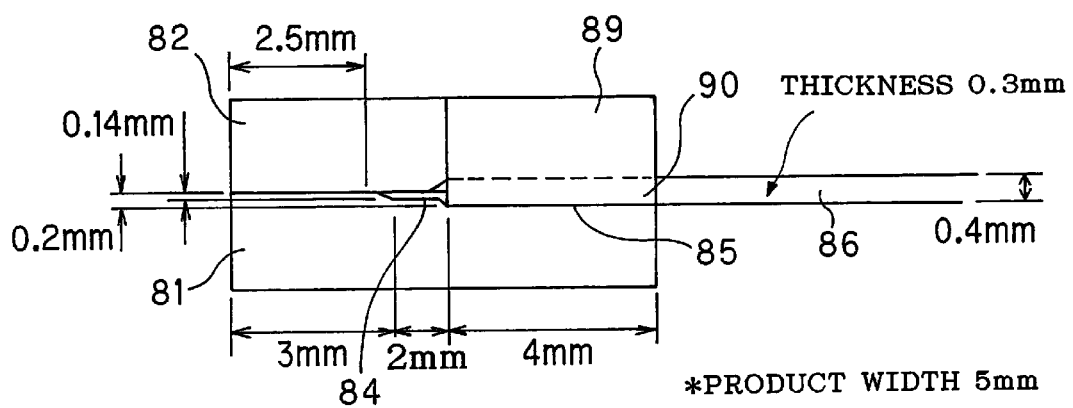
FIG. 4(b) is a front view.
Figure 4C:
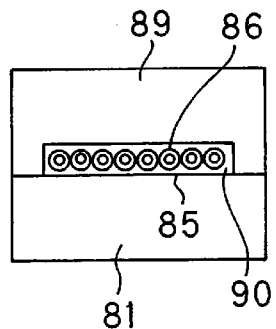
FIG. 4(c) is a right side view.

The standard type optical fiber array shown in FIGS. 4(a), (b), and (c) was produced.

Embodiment 2 differs from Embodiment 1 in that only a single fiber was used instead of two fibers placed on each other.

The difference from Embodiment 1 is mainly described below.

Due to the use of a single fiber, the standard type optical fiber array does not require a large taper angle such as mutual overlap to be avoided. Thus, a first step portion 84 may be shorter than in Embodiment 1. It is 2 mm according to Embodiment 2 in order to relieve the error of 0.05 mm on each side because a pitch error of about 0.1 mm is usually present in the tape fiber. A bend radius of the fiber became 20 mm, and good properties were obtained.

In Embodiment 2, a covered fiber housing substrate 89 corresponding to a second step portion 85 in a V-shaped groove substrate 81 was prepared, placed on the second step portion 85 in a V-shaped groove substrate 81, and stuck and fixed thereto while being aligned accurately therewith in both lateral and longitudinal directions. Next, a dicing machine was used to cut the combined substrates into chips having the dimensions shown in FIGS. 4(a), (b), and (c).

In addition, a fiber presser substrate 82 was prepared that fitted the V-shaped grooves 63 in the V-shaped groove substrate 81 and the first step portion 84 in terms of length and width.

Then, the components were assembled into an optical fiber array.

A tape fiber 86 of 0.3 mm thickness was inserted along the wall of covered fiber housing grooves 90 formed by sticking and fixing the V-shaped groove substrate 81 and the covered fiber housing substrate 89 together, until the fiber abutted on the end of the second step portion 85. In these conditions, the tape fiber 66 was temporarily locked outside the optical fiber array.

Next, a fiber presser substrate 82 was installed on the V-shaped grooves 83 and first step portion 84, and a load was applied to the substrate using a jig. Then, an adhesive consisting of an ultraviolet (UV) hardened resin was applied and introduced through the covered fiber housing groove 90. After moving out from the gaps in the V-shaped grooves 83, the adhesive was left hardened. Subsequently, the end surfaces of the substrates were optically polished to complete an optical fiber array.

As described above, this invention can provide an optical fiber array that allows the positional relationship between an uncovered optical fiber and a covered optical fiber to be set accurately, that can prevent its characteristics from being degraded, and that can avoid problems such as an open circuit in the fibers.

What is claimed is:

1. An optical fiber array comprising an upper substrate and a lower substrate in which V-shaped grooves are formed, optical fibers being inserted and arranged in the V-shaped grooves and being solidified using an adhesive, wherein:

the lower substrate comprises a V-shaped groove section having V-shaped grooves in which the optical fibers are aligned and arranged, a covered optical fiber support section for supporting covered optical fibers, and a free buffer section located between the V-shaped groove section and the covered optical fiber support section and that is prevented from restricting the alignment and arrangement of the optical fibers, and wherein:

the free buffer section continues with the covered fiber support section via a step.

2. An optical fiber array according to claim 1 wherein a taper is formed on the surface of the upper substrate opposed to the free buffer section of the lower substrate.

3. An optical fiber array according to claim 1 comprising a half-pitch optical fiber array in which two sets of tape fibers are mutually overlapped.

4. An optical fiber array according to claim 2 comprising a half-pitch optical fiber array in which two sets of tape fibers are mutually overlapped.

5. An optical fiber array according to claim 1 wherein a taper is formed in the portion of the free buffer section that is connected to the V-shaped grooves.

6. An optical fiber array according to claim 2 wherein a taper is formed in the portion of the free buffer section that is connected to the V-shaped grooves.

7. An optical fiber array according to claim 3 wherein a taper is formed in the portion of the free buffer section that is connected to the V-shaped grooves.

* * * * *